(12) United States Patent
Ishii et al.

(10) Patent No.: US 11,097,683 B2
(45) Date of Patent: Aug. 24, 2021

(54) AIRBAG AND METHOD OF MANUFACTURING THE SAME

(71) Applicant: TOYODA GOSEI CO., LTD., Kiyosu (JP)

(72) Inventors: Tsutomu Ishii, Kiyosu (JP); Masashi Hotta, Kiyosu (JP); Koji Kawamura, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 91 days.

(21) Appl. No.: 16/570,080

(22) Filed: Sep. 13, 2019

(65) Prior Publication Data

US 2020/0101928 A1 Apr. 2, 2020

(30) Foreign Application Priority Data

Sep. 27, 2018 (JP) .............................. JP2018-182499

(51) Int. Cl.
*B60R 21/235* (2006.01)
*B60R 21/2338* (2011.01)
(Continued)

(52) U.S. Cl.
CPC ........ *B60R 21/235* (2013.01); *B60R 21/2338* (2013.01); *B60R 21/2346* (2013.01);
(Continued)

(58) Field of Classification Search
CPC . B60R 21/203; B60R 21/231; B60R 21/2338; B60R 21/2346; B60R 21/235;
(Continued)

(56) References Cited

U.S. PATENT DOCUMENTS 5,316,337 A * 5/1994 Yamaji ................... D05B 39/00
  280/728.1
5,520,414 A * 5/1996 Bishop .................. B60R 21/231
  280/728.1
(Continued)

FOREIGN PATENT DOCUMENTS

JP H08-501517 A 2/1996
JP 2019038399 A * 3/2019
JP 2019209728 A * 12/2019 ........... B60R 21/231

*Primary Examiner* — Laura Freedman
(74) *Attorney, Agent, or Firm* — Posz Law Group, PLC

(57) ABSTRACT

An airbag includes a mounting portion, a top wall deployable towards a vehicle occupant, and a circumferential wall disposed between the mounting portion and top wall. An airbag base member for forming the airbag includes a top-forming panel for forming the top wall, and at least three circumferential panels that extend generally radially from the top-forming panel and form the circumferential wall by being joined together by adjoining edges thereof. Each of the circumferential panels is formed into a generally band-like contour which has a first and a second curving edges that make the circumferential panel enlarge in width from the leading end towards an intermediate portion and then narrow towards the top-forming panel. When the airbag base member is laid flat, adjoining edges of any two adjoining circumferential panels are generally symmetrical to each other in curving shape with respect to a line disposed there between.

10 Claims, 9 Drawing Sheets

(51) Int. Cl.
*B60R 21/2346* (2011.01)
*B60R 21/203* (2006.01)

(52) U.S. Cl.
CPC ... *B60R 21/203* (2013.01); *B60R 2021/23382* (2013.01); *B60R 2021/23538* (2013.01); *B60R 2021/23576* (2013.01)

(58) Field of Classification Search
CPC .......... B60R 2021/23382; B60R 2021/23538; B60R 2021/23571; B60R 2021/23576
See application file for complete search history.

(56) References Cited

U.S. PATENT DOCUMENTS

| | | | | |
|---|---|---|---|---|
| 5,529,340 | A * | 6/1996 | Fairbanks | B60R 21/231 280/728.1 |
| 5,533,755 | A | 7/1996 | Nelsen et al. | |
| 5,865,467 | A * | 2/1999 | Bito | B60R 21/231 280/728.1 |
| 5,975,571 | A * | 11/1999 | Ford | B60R 21/231 280/743.1 |
| 6,612,609 | B1 * | 9/2003 | Rodriguez | B60R 21/201 280/729 |
| 7,922,198 | B2 * | 4/2011 | Urushibata | B60R 21/235 280/743.1 |
| 8,955,879 | B2 * | 2/2015 | Aranzulla | B60R 21/231 280/743.1 |
| 10,899,309 | B2 * | 1/2021 | Hotta | B60R 21/203 |

* cited by examiner

Fig. 7
(A)
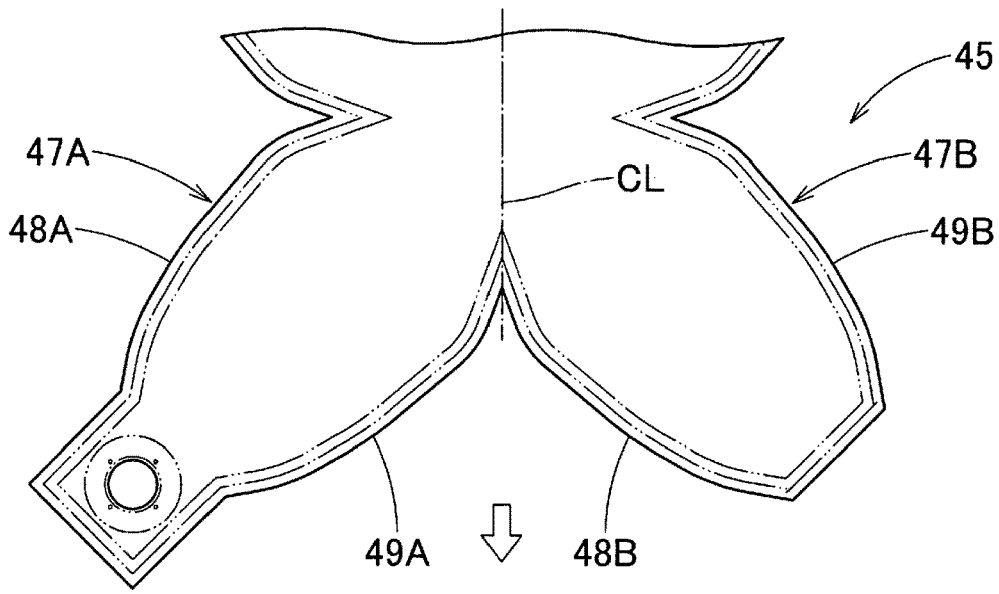
(B)
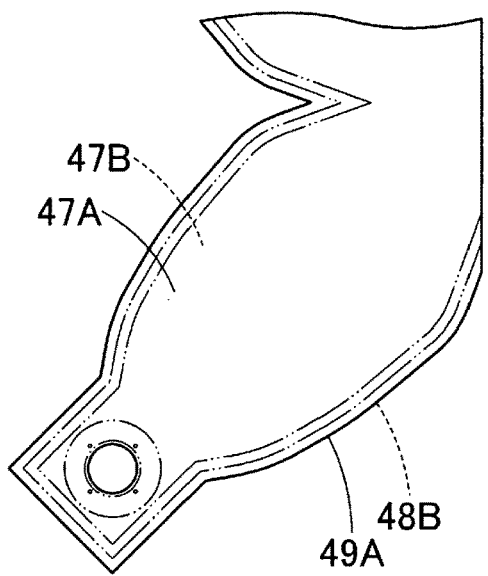
(C)
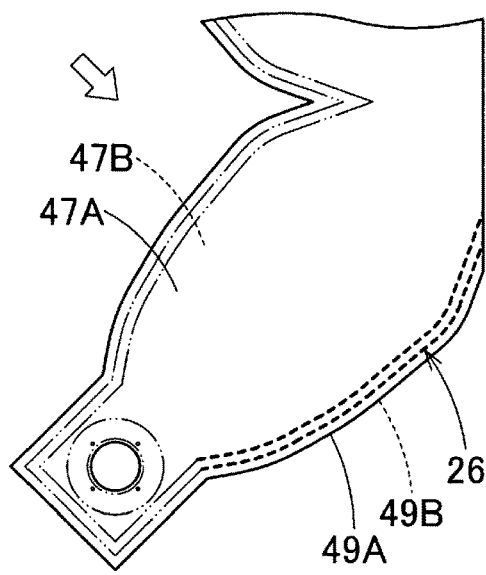

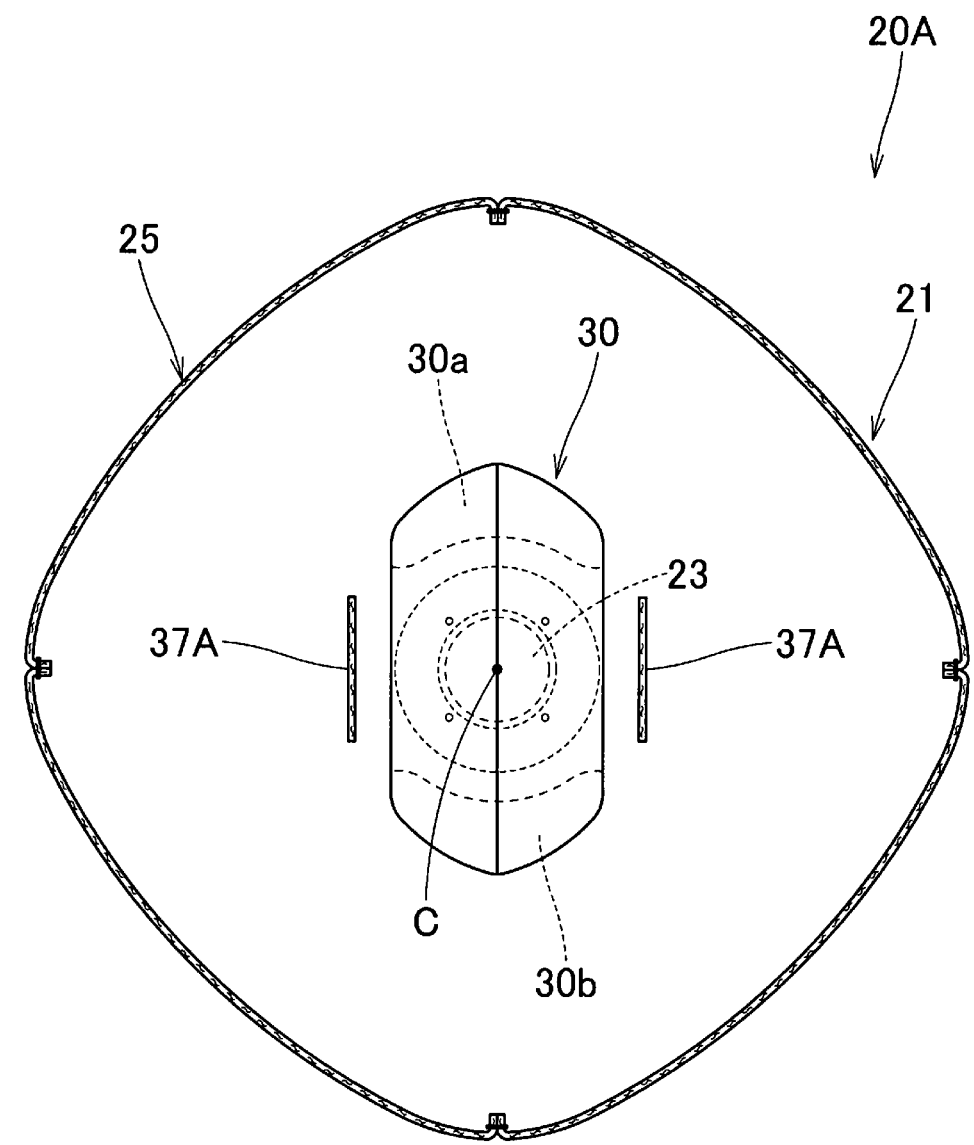

AIRBAG AND METHOD OF MANUFACTURING THE SAME

CROSS REFERENCE TO RELATED APPLICATIONS

The Present application claims priority from Japanese Patent Application No. 2018-182499 of Ishii et al., filed on Sep. 27, 2018, the entire disclosure of which is incorporated herein by reference.

BACKGROUND

1. Field of the Invention

The present invention relates to an airbag that is formed of a flexible sheet-shaped material and adapted to be stored in a storage in a folded configuration for inflation and deployment when fed with an inflation gas.

2. Description of Related Art

JPH08 501517 A discloses a known airbag including a top wall which is deployable towards a vehicle occupant, a mounting portion which is adapted to be coupled to a storage, and a circumferential wall which extends from an outer circumference of the top wall towards the mounting portion. The airbag is formed of a base member which includes a top-forming panel for forming the top wall, and four circumferential panels which extend radially from the top-forming panel. The airbag is formed by jointing four sets of adjoining edges of the circumferential panels together.

Although the conventional airbag described above is formed easily by jointing the adjoining edges of the circumferential panels together, since each of the circumferential panels has such a contour that tapers towards the leading end from the root portion disposed towards the top-forming panel, the circumferential wall composed by jointing the circumferential panels has such a contour that converges towards the mounting portion. Moreover, since the top-forming panel has a generally rectangular contour, the top wall as deployed is flat and has four angular corners. It would be desirable to provide an airbag that, when inflated, does not include any angular portions and has a sufficient thickness.

SUMMARY

An exemplary embodiment of the invention relates to an airbag which is composed of a flexible sheet-shaped material, and is inflatable with an inflation gas and adapted to be folded and stored in a storage in a vehicle. The airbag includes a mounting portion that includes an inlet port for taking in the inflation gas and that is adapted to be coupled to the storage by a periphery of the inlet port, a top wall that is configured to be opposed to the mounting portion and face towards a seat when deployed, a circumferential wall that is disposed between the mounting portion and top wall, and an airbag base member that forms the airbag.

The airbag base member includes a top-forming panel that forms the top wall, and at least three circumferential panels that extend generally radially from the top-forming panel and form the circumferential wall by being joined together by adjoining edges thereof.

Each of the circumferential panels is formed into a generally band-like contour which has a mount-side end which is adapted to adjoin the mounting portion, an intermediate portion, a top-side end adjoining the top-forming panel, and a first and a second curving edges that make the circumferential panel enlarge in width from the mount-side end towards the intermediate portion and then narrow towards the top-side end. When the airbag base member is laid flat, the adjoining edges of any two adjoining circumferential panels are generally symmetrical to each other in curving shape with respect to a line disposed there between.

With the airbag configured as described above, the circumferential wall formed by joining the adjoining edges of the adjoining circumferential panels together is formed into a generally barrel shape that bulges the most in the intermediate portion between the mounting portion and top wall and reduces in diameter towards the mounting portion and top wall, when inflated. The airbag has at least three joined portions of the adjoining edges around the top wall, and each of the joint portions is disposed through the entire length in the up and down direction of the circumferential wall, generally along the axial direction of the circumferential. Formed into curving shapes drawing near to one another towards the top wall, the joined portions cause few angular portions in a vicinity of the border between the circumferential wall and top wall in the airbag as inflated. Moreover, since the circumferential wall is composed of the circumferential panels which are split into at least three, the circumferential wall is formed into the barrel shape with a sufficient height or thickness when inflated, and the height is maintained by the joined portions placed at three or more positions in the circumferential wall.

Therefore, the airbag of the exemplary embodiment is inflatable into the contour with a sufficient height and few angular portions.

In the airbag configured as described above, it is desired that a mount-forming panel is formed continuously from the mount-side end of one of the circumferential panels for forming the mounting portion. This configuration facilitates the production of the airbag in comparison with an instance where the mounting portion is formed of a separate base member.

Particularly, it is desired that the circumferential wall is composed of four circumferential panels.

It is also desired that the airbag further internally includes two or four tethers that are radially arranged about the inlet port for limiting a clearance between the mounting portion and top wall at airbag deployment. The tethers prevent the top wall from protruding towards a vehicle occupant excessively and being deployed apart from the mounting portion more than necessary at airbag deployment.

It is further desired that the airbag further internally includes a redirecting cloth that redirects the inflation gas which has flown in via the inlet port and releases the gas from two outlet openings thereof at airbag deployment, and that the two outlet openings are disposed at positions opposite across the inlet port and dislocated from the tethers.

This configuration will help unfold the airbag largely in a front and rear direction, in a left and right direction or the like in an initial stage of airbag deployment. Moreover, since the outlet openings are dislocated from the tethers, the tethers will be able to control the behavior of the top wall adequately without being affected by a redirected inflation gas at airbag deployment.

BRIEF DESCRIPTION OF DRAWINGS

FIG. 7 schematically illustrates the production process of the airbag of FIG. 3.

FIG. 9 is a schematic transverse sectional view of an airbag in accordance with an alternative embodiment.

DETAILED DESCRIPTION

Exemplary embodiments are described below with reference to the accompanying drawings. However, the invention is not limited to the embodiments disclosed herein. All modifications within the appended claims and equivalents relative thereto are intended to be encompassed in the scope of the claims.

Figure 1:
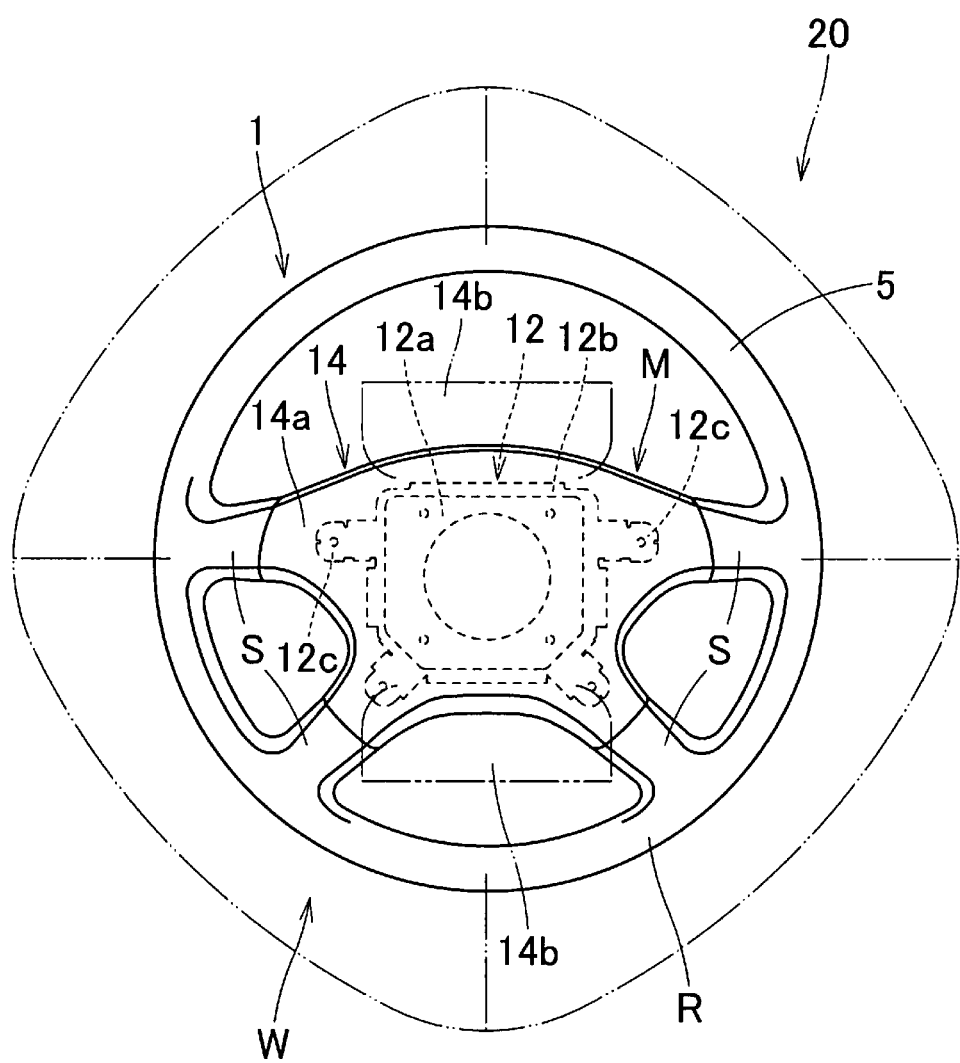
FIG. 1 is a schematic plan view of an airbag device for a steering wheel which uses an airbag in accordance with an exemplary embodiment.
Figure 2:
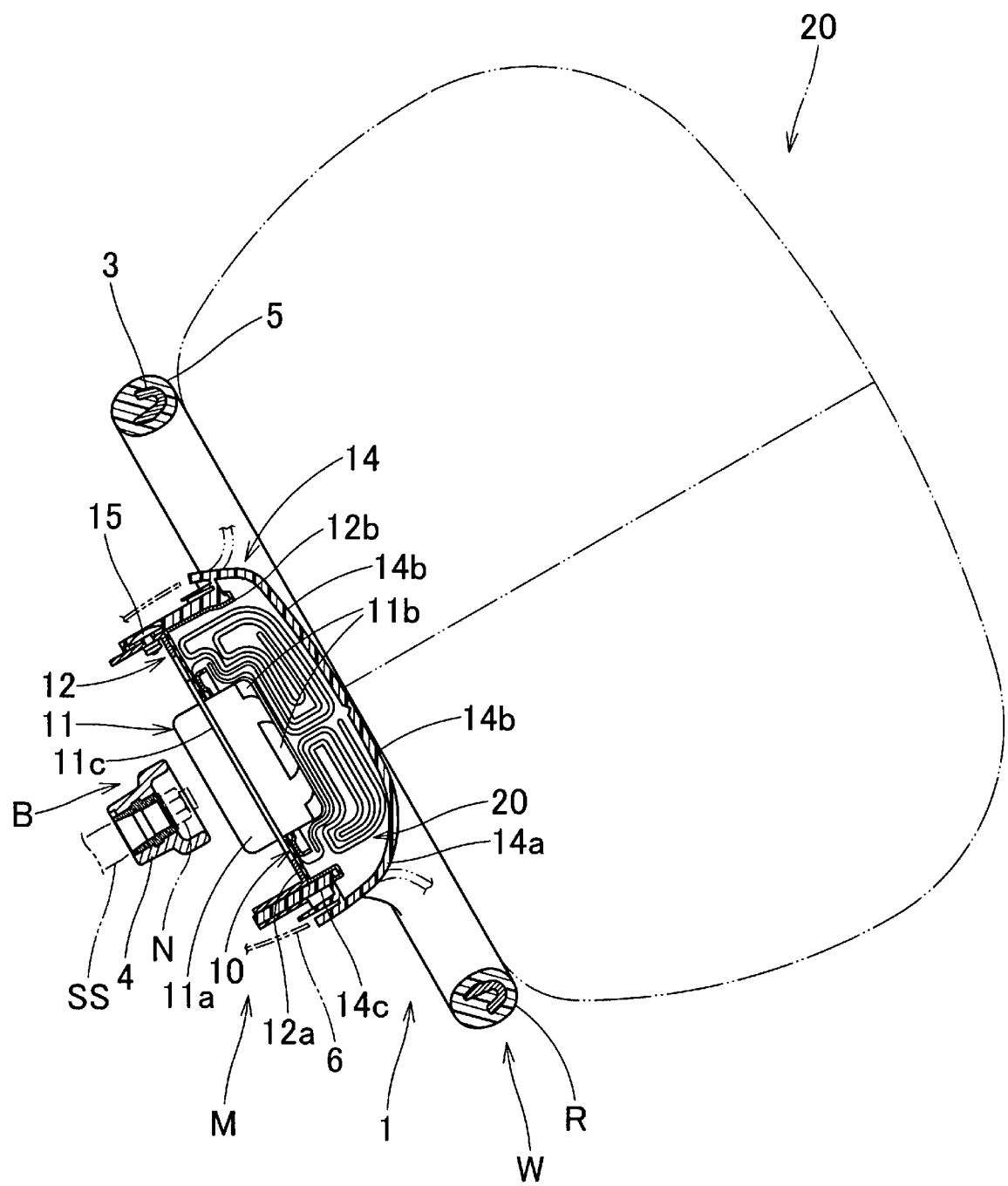
FIG. 2 is a schematic vertical sectional view of the airbag device of FIG. 1 as mounted on a vehicle.

An airbag 20 according to an exemplary embodiment is used in an airbag device M for a steering wheel mounted on a steering wheel W as depicted in FIGS. 1 and 2. The steering wheel W includes a wheel body 1 and the airbag device M. The wheel body 1 of the illustrated embodiment includes a generally annular rim R which is adapted to be gripped with hands for steering, a boss section B which is disposed generally at the center of the rim R and connected to a shaft SS (FIG. 2), and four spokes S which interconnect the rim R and the boss section B. The airbag device M is mounted on top of the boss section B. Unless otherwise specified, front and rear, up and down, and left and right directions in this description are intended to refer to the directions viewed from the steering wheel mounted on board and steered straight ahead. Therefore, the up and down direction refers to a direction extending along an axial direction of the shaft SS, the front and rear direction refers to a front and rear direction of a vehicle perpendicular to the axial direction of the shaft SS, and the left and right direction refers to a left and right direction of the vehicle perpendicular to the axial direction of the shaft SS.

As shown in FIGS. 1 and 2, the wheel body 1 includes a core 3 which is made from such metal as aluminum alloy, and has such a contour that the rim R, the boss section B and the spokes S are interconnected. A cladding layer 5 made from synthetic resin covers the core 3 on the rim R and regions of the spokes S adjoining the rim R. A boss 4 made from steel is disposed in the boss section B of the core 3 for receiving and fastening with the shaft SS with a nut N. A lower cover 6 is disposed in a lower portion of the wheel body 1 for covering a lower side of the boss section B.

As shown in FIG. 1, the airbag device M, which is disposed in the boss section B of the steering wheel W, includes an airbag 20 which is folded up, an inflator 11 for supplying the airbag 20 with an inflation gas, a case or storage 12 which houses and holds the airbag 20 and inflator 11, an airbag cover 14 which covers the airbag 20, and a retainer 10 which is used to mount the airbag 20 and inflator 11 on the case 12.

As shown in FIG. 2, the inflator 11 includes a body 11a which is formed into a generally pot-like shape and provided with a plurality of gas discharge ports 11b, and a flange 11c used to mount the inflator 11 on the case 12. The flange 11c includes a plurality of not-shown through holes for receiving not-shown bolts of the retainer 10.

The case (or storage) 12 is made of sheet metal, and includes a bottom wall 12a which is formed into a generally rectangular board and includes an opening for receiving the inflator 11 from below, and a circumferential wall 12b which extends vertically from an outer circumferential edge of the bottom wall 12a, as shown in FIG. 2. As shown in FIG. 1, the circumferential wall 12b is provided, on the top, with one or more mounting tongues 12c which extend outwardly. A not-shown mounting base of a not-shown horn switch mechanism is attached to the mounting tongues 12c. With the aid of the mounting base(s), the case 12 is secured to the core 3 of the steering wheel W, and the airbag device M is mounted on the boss section B of the wheel body 1 as connected to the shaft SS. As shown in FIG. 2, the circumferential wall 12b of the case 12 is coupled with a side wall 14c of the airbag cover 14 through the use of rivets 15 or the like. In the illustrated embodiment, the airbag 20 and inflator 11 are secured to the bottom wall 12a of the case 12 through the use of not-shown bolts of the retainer 10. More specifically, the retainer 10 is housed in the airbag 20 such that the bolts go through later-described mounting holes 24 formed in a periphery of a later-described inlet port 23 of the airbag 20, the bottom wall 12a of the case 12, and the flange 11c of the inflator 11, then fastened with nuts. Thus the airbag 20 and inflator 11 are secured to the bottom wall 12a of the case 12.

The airbag cover 14 is fabricated from synthetic resin, and includes a ceiling wall portion 14a for covering an upper side of the airbag 20 as stored in the case 12, and a side wall 14c which extends downward from a vicinity of an outer edge of the ceiling wall portion 14a in a generally square tubular shape. The ceiling wall portion 14a is provided with two doors 14b which are openable forward and rearward when pushed by the airbag 20 as inflated.

Figure 3:
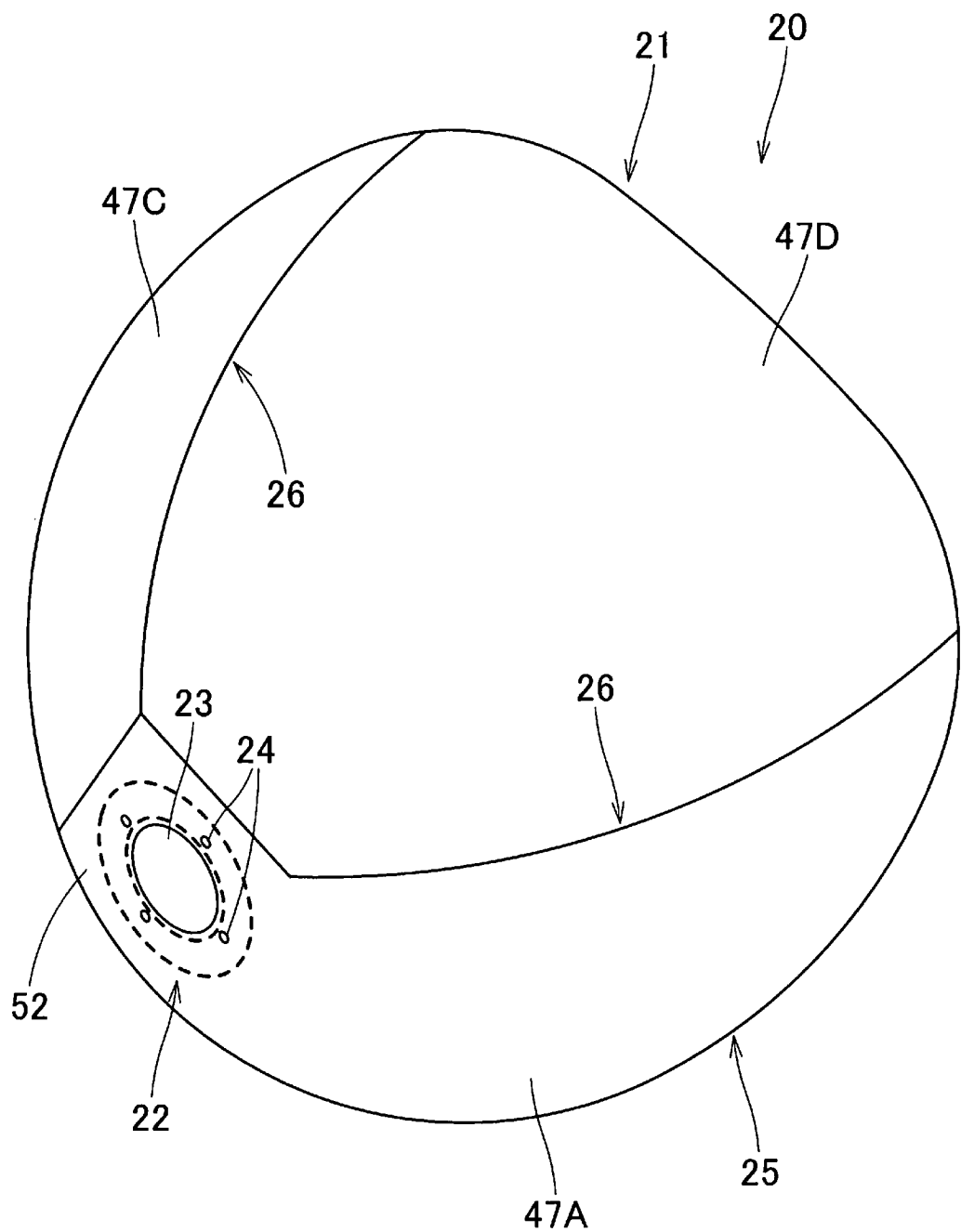
FIG. 3 is a schematic perspective view of the airbag in accordance with the exemplary embodiment as inflated by itself.
Figure 4:
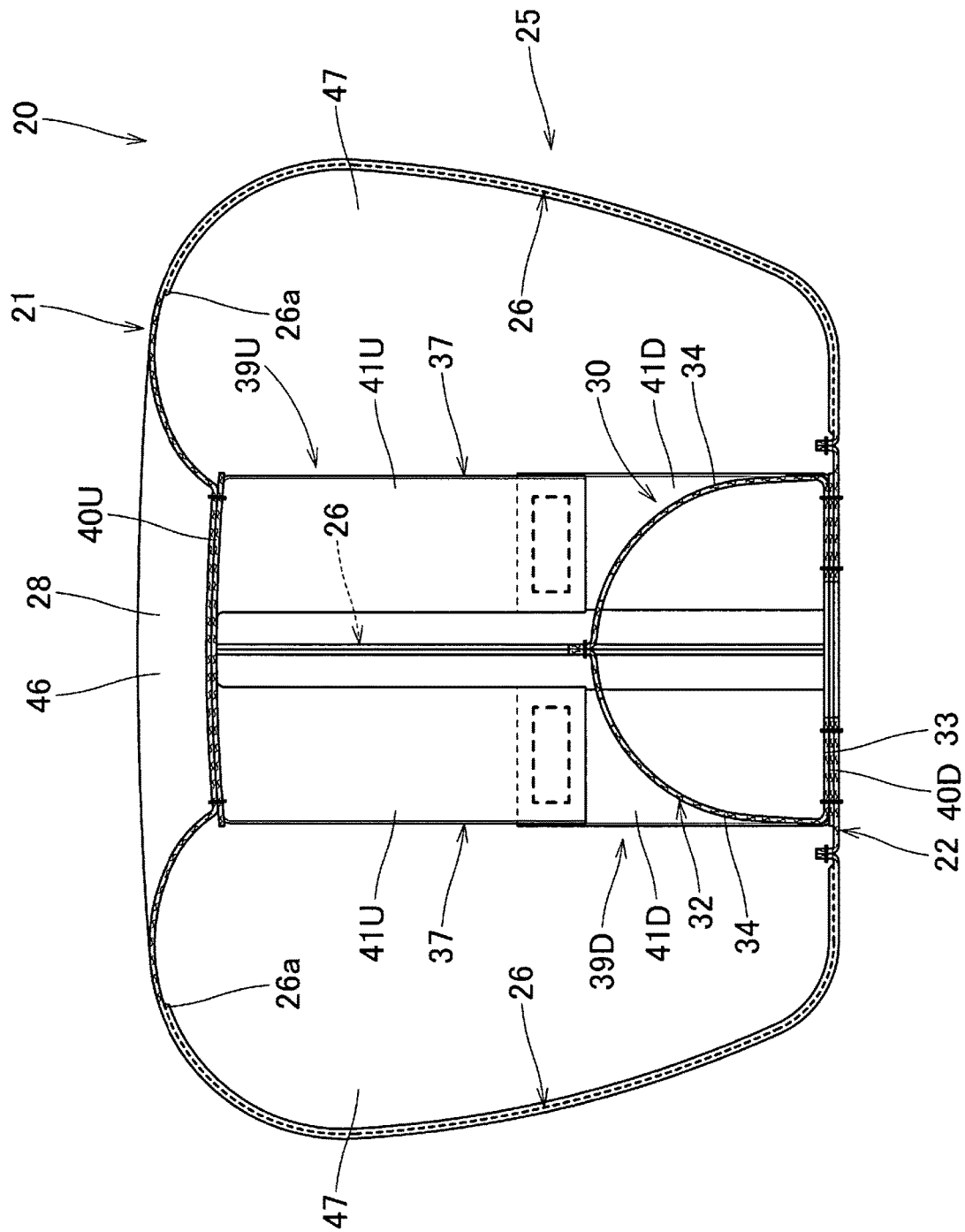
FIG. 4 is a schematic vertical sectional view of the airbag of FIG. 3.
Figure 5:
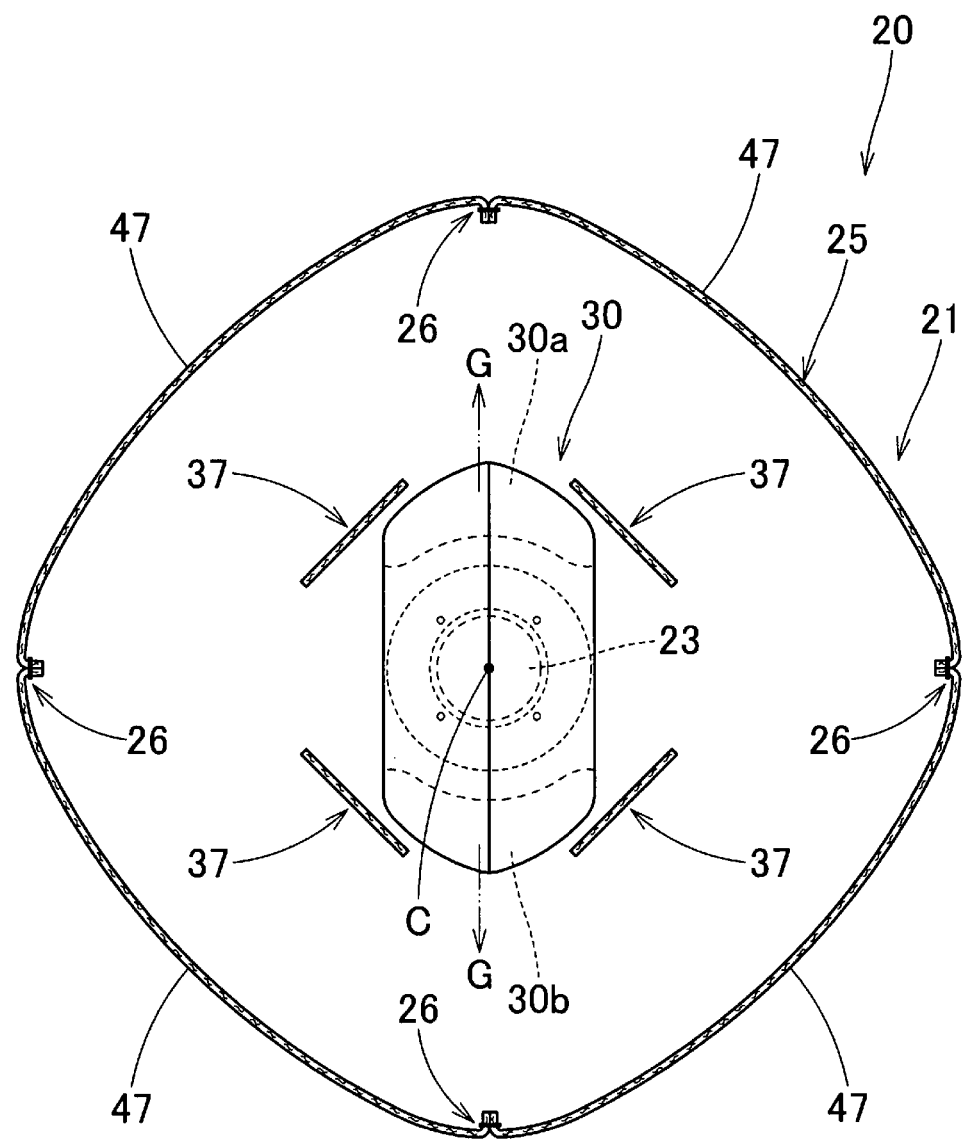
FIG. 5 is a schematic transverse sectional view of the airbag of FIG. 3.

As shown in FIGS. 3 to 5, the airbag 20 includes a bag body 21, and inside the bag body 21, a redirecting cloth 30 and four tethers 37.

The bag body 21 is configured to cover the top plane of the rim R of the steering wheel W generally all over when deployed, as indicated with double-dotted lines in FIGS. 1 and 2. The bag body 21 includes a mounting portion 22 which is adapted to be coupled to the case (storage) 12, a top wall 28 which is opposed to the mounting portion 22 and faces upward (or towards a vehicle occupant) when deployed, and a circumferential wall 25 which is disposed between the mounting portion 22 and top wall 28, and is designed to be inflated into a generally barrel shape. More particularly, as viewed from an up and down direction, the bag body 21 of the illustrated embodiment has a generally quadrangular outer contour which has rounded corners and four sides each of which gently curves and slightly bulges outwardly. As viewed from a side, the bag body 21 has a generally trapezoidal outer contour which slightly narrows in width towards the mounting portion 22 from the upper portion (or from the top wall 28), and has rounded corners and sides each of which gently curves and slightly bulges outwardly (see the double-dotted lines in FIGS. 1 and 2).

The mounting portion 22 is provided with a round inlet port 23 for receiving the inflator body 11a for taking in an inflation gas G. Four mounting holes 24 are formed in the periphery of the inlet port 23 for receiving the not-shown bolts of the retainer 10. The mounting portion 22 is attached to the case 12 by the periphery of the inlet port 23 with the aid of the retainer 10.

The circumferential wall 25 is inflatable into such a generally barrel shape that bulges the most (has a largest diameter) in an intermediate portion between the mounting portion 22 and top wall 28 and reduces in diameter towards the mounting portion 22 and top wall 28. The circumferential wall 25 includes four joined portions 26 each of which is formed by joining circumferential edges 48 and 49 of later-described circumferential panels 47. The four joined portions 26 are arranged generally radially about an opening center C of the inlet port 23. More specifically, as viewed from a side, the circumferential wall 25 as inflated has such an outer contour that is great in width in the upper portion in a vicinity of the top wall 28 and slightly reduces in width towards the mounting portion 22 from the upper portion. In the illustrated embodiment, the joined portions 26 are located at four positions in the front, rear, left and right of the opening center C of the inlet port 23 in the bag body 21 as inflated and deployed on the steering wheel W in straight-ahead position, and each of the joined portions 26 continuously extends through an entire length in an up and down direction of the circumferential wall 25, generally along an axial direction of the circumferential wall 25 (i.e. generally along the up and down direction). Even more specifically, as can be seen in FIG. 4, the four joined portions 26 are formed in a curving fashion such that the upper ends 26a draw near to one another and enter into an area of the top wall 28 in the airbag 20 as deployed.

The redirecting cloth 30 is disposed over the inlet port 23 inside the bag body 21 for redirecting an inflation gas which has flown in via the inlet port 23. The redirecting cloth 30 is formed into such a generally tubular contour and has two outlet openings 30a and 30b of the inflation gas at positions opposite across the inlet port 23. The redirecting cloth 30 of the illustrated embodiment is formed into a generally tubular contour with the outlet openings 30a and 30b in the front end and rear end. In the illustrated embodiment, the redirecting cloth 30 is composed of a base member 32 depicted in FIG. 6. The base member 32 includes a joint portion 33 which is disposed in the center and adapted to be joined to the periphery of the inlet port 23 of the mounting portion 22 of the bag body 21, and a pair of body portions 34 which extend towards the left and right. The body portions 34 are joined together by the leading edges 34a and form the redirecting cloth 30.

The tethers 37 connect the mounting portion 22 and top wall 28 in order to limit a clearance between the mounting portion 22 and top wall 28 in the bag body 21 as inflated. In the illustrated embodiment, the four tethers 37 are disposed generally radially about the inlet port 23. More particularly, the tethers 37 are each formed into a band, and disposed at four positions diagonally to the left front, right front, left rear and right rear of the opening center C of the inlet port 23, circumventing the outlet openings 30a and 30b of the redirecting cloth 30, such that the width direction of each of the tethers 37 is inclined to the front-rear direction and left-right direction, as can be seen in FIG. 5. The tethers 37 are composed of two base members 39U and 39D depicted in FIG. 6. Each of the base members 39U and 39D includes a joint portion 40U/40D adapted to be joined to the top wall 28/mounting portion 22, and four tether-forming portions 41U/41D which extend radially from an outer circumferential edge of the joint portion 40U/40D. With the joint portions 40U and 40D respectively joined to the top wall 28 and mounting portion 22, and leading ends of the tether-forming portions 41U and 41D coupled together, the base members 39U and 39D form the tethers 37.

Figure 6:
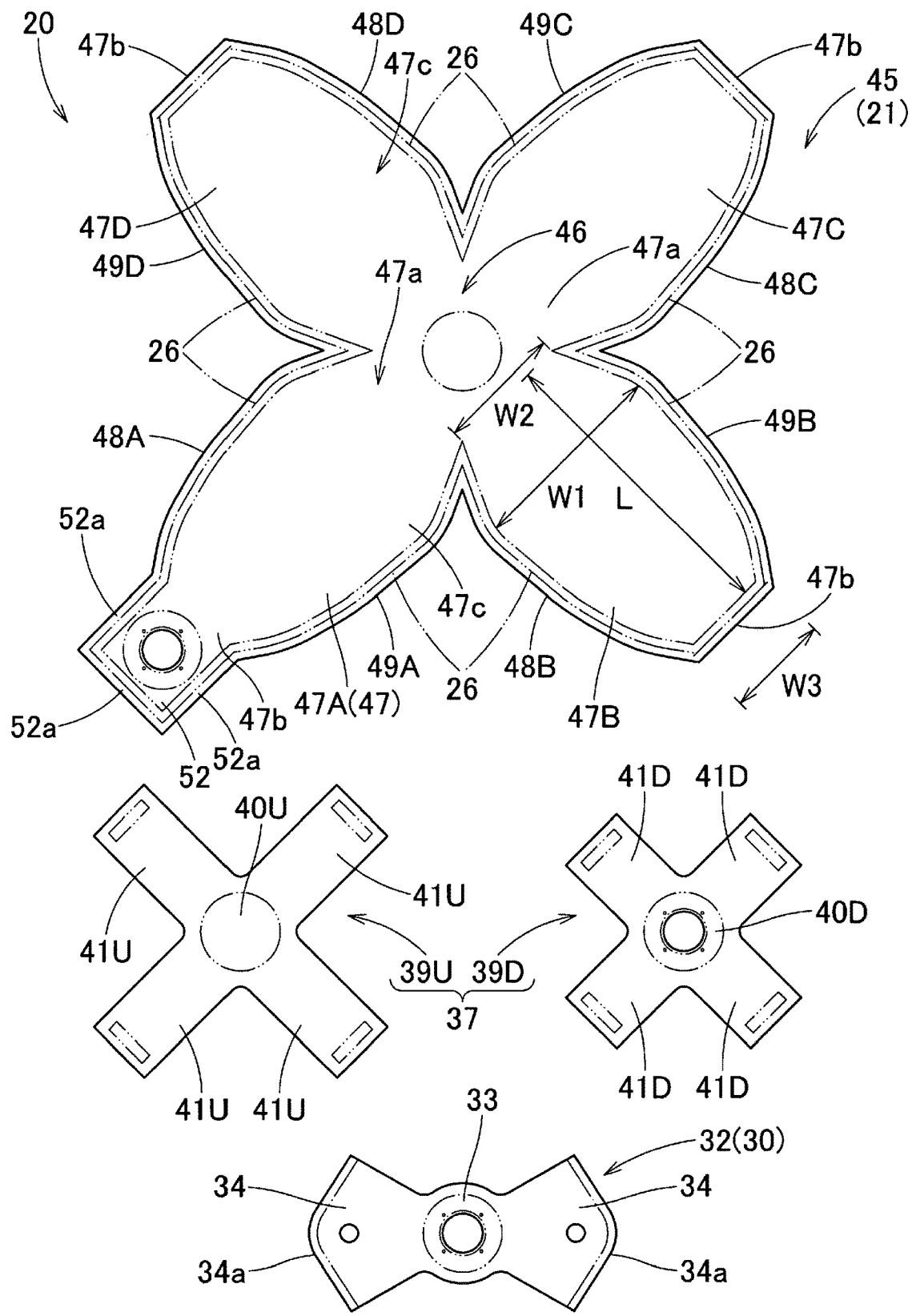
FIG. 6 depicts base members of the airbag of FIG. 3 in plan.

The bag body 21 of the illustrated embodiment is composed of an airbag base member 45 depicted in FIG. 6. The airbag base member 45 includes a top-forming panel 46 for forming the top wall 28, four circumferential panels 47 which extend generally radially from the top-forming panel 46, and a mount-forming panel 52 which is disposed at the leading end of one circumferential panel 47A out of the four circumferential panels 47. In the illustrated embodiment, the airbag base member 45 has bilateral and anteroposterior symmetry except the mount-forming panel 52.

In the illustrated embodiment, the top-forming panel 46 is a generally square area whose diagonals extend generally along the front and rear direction and left and right direction (in other words, a generally square area whose corners are located in the front, rear, left and right).

The circumferential panels 47 (47A, 47B, 47C, 47D) are formed to extend in four directions from four sides of the top-forming panel 46. The circumferential panels 47 each extend diagonally to the left front, right front, left rear and right rear from the top-forming panel 46. In the illustrated embodiment, the circumferential panels 47A, 47B, 47C, 47D are identical in outer contour. Each of the circumferential panels 47A, 47B, 47C, 47D is formed generally into a band having a first curving edge 48A, 48B, 48C, 48D and a second curving edge 49A, 49B, 49C, 49D such that the circumferential panel 47 enlarges in width towards an intermediate portion from a mount-side end (or leading end) 47b disposed towards the mounting portion 22, then converges or narrows towards a top-side end (or root end) 47a (i.e. towards the top-forming panel 46). The circumferential panels 47 (47A, 47B, 47C, 47D) are configured such that each adjoining edges of the adjoining circumferential panels 47 such as the edge 48B and the edge 49A, for example, are generally symmetrical to each other in curving shape with respect to a line disposed there between (in other words, generally symmetrical with respect to a later-described crease CL shown in FIG. 7) as the base member 45 is laid flat. In the illustrated embodiment, more specifically, the circumferential panels 47 (47A, 47B, 47C, 47D) are identical in outer contour, and the first and second edges of each of the panels 47 (the edges 48A and 49A of the circumferential panel 47A, for example) are generally symmetrical with respect to a center line which runs through a center in a width direction of each of the circumferential panels 47.

More particularly, each of the circumferential panels 47 is configured such that a width of the top-side end 47a is greater than that of the mount-side end 47b. In the illustrated embodiment, as can be seen in FIG. 6, a width W1 of a wide portion 47c that is greatest in width is approximately seven ninths of the length L of the circumferential panel 47. A width W2 of the top-side end 47a is approximately three fourths of the width W1 of the wide portion 47c, and a width W3 of the mount-side end 47b is approximately half of the width W1 of the wide portion 47c. Further, in each of the circumferential panels 47, the wide portion 47c which is greatest in width is disposed towards or in a vicinity of the top-side end 47a.

The mount-forming panel 52 is formed to extend from the mount-side end 47b of one of the four circumferential panels 47 (the circumferential panel 47A disposed at the bottom left in FIG. 6, in the illustrated embodiment), and is formed into a generally square each side of which has a generally identical width to the width of the mount-side end 47b of each of the circumferential panels 47. That is, in a similar fashion to the top-forming panel 46, the mount-forming panel 52 is generally a square whose diagonals extend generally along the front and rear direction and left and right direction (in other words, a square whose corners are located in the front, rear, left and right).

In the illustrated embodiment, the base member forming the airbag 20; the base member 45 for forming the bag body 21, the base member 32 for forming the redirecting cloth 30, and the base members 39U and 39D for forming the tethers 37, are made of flexible woven fabric of polyamide yarns, polyester yarns or the like.

Production of the airbag 20 of the illustrated embodiment is now described. Firstly, the joint portion 33 of the base member 32 of the redirecting cloth 30 and the joint portion 40D of the base member 39D of the tethers 37 are placed on the mount-forming panel 52 of the airbag base member 45 in order, and the joint portion 33 and joint portion 40D are sewn and joined to the periphery of the inlet port 23 in the mount-forming panel 52 with sewing threads. Then the inlet port 23 and mounting holes 24 are punched out there. The leading edges 34*a* of the body portions 34 of the base member 32 are sewn together, thus forming the redirecting cloth 30. Then the joint portion 40U of the base member 39U of the tethers 37 is sewn to the top-forming panel 46 of the airbag base member 45 with sewing threads, and ends of corresponding tether-forming portions 41U and 41D of the base members 39U and 39D are sewn together, thus forming the tethers 37. Thereafter, as schematically depicted in (A) of FIG. 7, the airbag base member 45 is folded back on a crease CL which runs across the top-forming panel 46 between the circumferential panels 47A and 47B such that the edge 49A of the circumferential panel 47A is mated with the adjoining edge 48B of the circumferential panel 47B. Then the edges 49A and 48B are sewn together with sewing threads to form a joined portion 26, as shown in (B) and (C) of FIG. 7, and the same joining work is conducted three times more around the top-forming panel 46. Thus four joined portions 26 are formed, and the circumferential wall 25 is completed. Thereafter, a circumferential edge 52*a* of the mount-forming panel 52 is sewn to the mount-side ends 47*b* of the circumferential panels 47B, 47C and 47D with sewing threads. Thus the bag body 21 is formed into a bag shape. If the bag body 21 is then reversed inside out via the inlet port 23 such that seam allowances are stored inside, the airbag 20 is completed.

The airbag 20 produced as described above is mounted on a vehicle as follows: Firstly, the retainer 10 is stored inside the airbag 20 such that the not-shown bolts of the retainer 10 protrude out from the mounting holes 24, and the airbag 20 is folded up to be stored in the case 12. Then the airbag 20 as folded is stored in the case 12, while the inflator body 11*a* is inserted into the case 12 from below the bottom wall 12*a*. Then the airbag 20 and inflator 11 are mounted on the case 12 by fastening the bolts protruding from the bottom wall 12*a* with nuts. Then the airbag cover 14 is placed over the case 12, and secured to the case 12 with rivets 15 or the like. If then the not-shown horn switch mechanism is attached to the mounting tongues 12*c* of the case 12, the airbag device M is finished. The airbag device M is mounted on the steering wheel body 1 as has been fastened to the shaft SS through the use of the not-shown mounting base of the horn switch mechanism. Thus the airbag device M is mounted on the vehicle.

Figure 8:
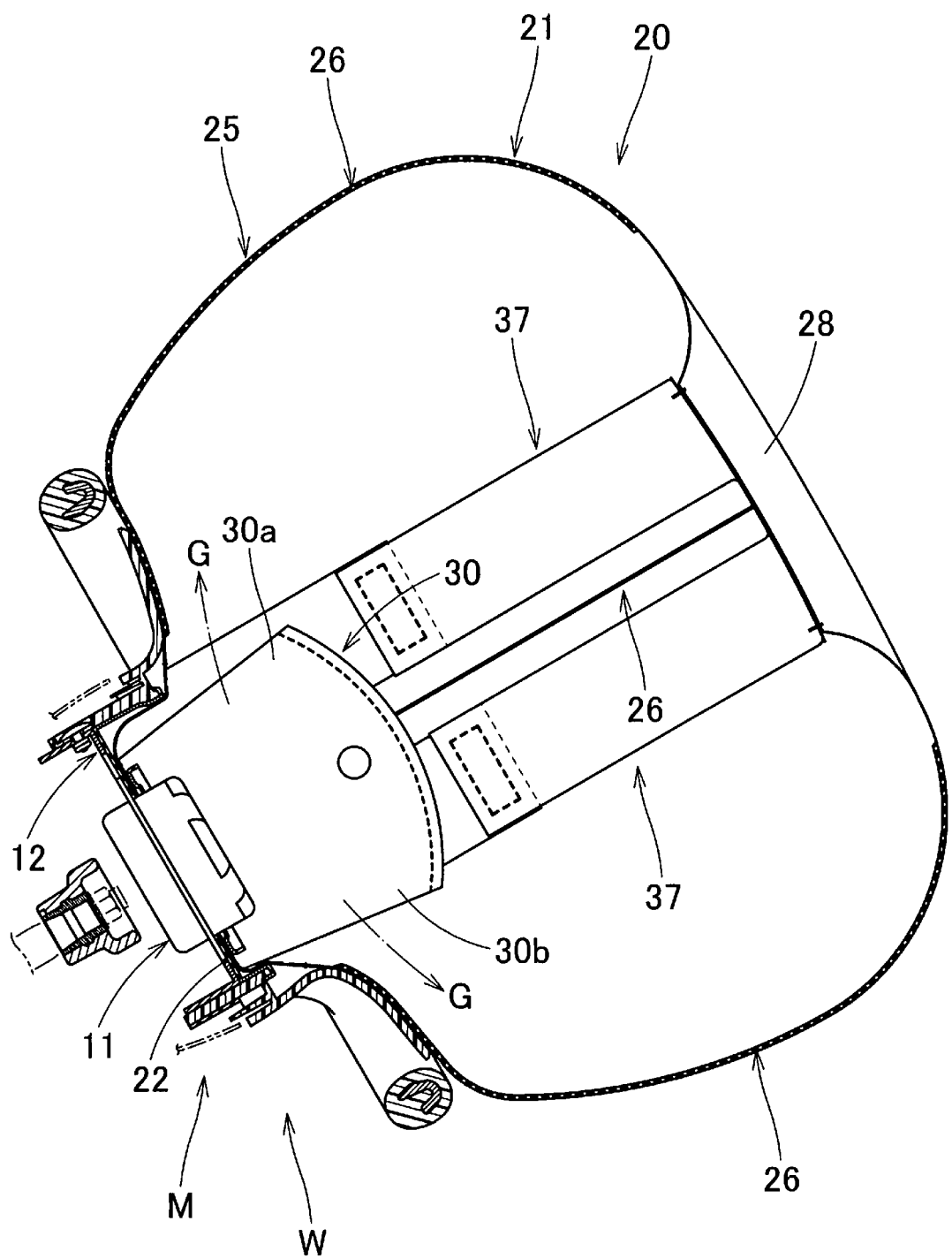
FIG. 8 is a schematic vertical sectional view of the airbag device of FIG. 1 as the airbag is deployed.

When the airbag device M is actuated, the inflator 11 feeds an inflation gas G to the airbag 20 via the gas discharge ports 11*b*, the airbag 20 is then inflated, pushes and opens the doors 14*b* of the airbag cover 14, protrudes from the case 12 and deployed over the steering wheel W, as can be seen in FIGS. 1 and 2 with double-dotted lines and in FIG. 8.

With the airbag 20 of the exemplary embodiment, the circumferential wall 25 formed by joining the adjoining edges 48 and 49 of the adjoining circumferential panels 47 together is formed into a generally barrel shape that bulges the most (i.e. has a largest diameter) in the intermediate portion between the mounting portion 22 and top wall 28 and reduces in diameter towards the mounting portion 22 and top wall 28, when inflated. At least three (four, in the illustrated embodiment) joined portions 26 of the adjoining edges 48 and 49 are each disposed through the entire length in the up and down direction of the circumferential wall 25, generally along the axial direction (i.e. generally along the up and down direction) of the circumferential wall 25, around the top wall 28. Formed into curving shapes drawing near to one another towards the top wall 28, the joined portions 26 cause few angular portions in a vicinity of the border between the circumferential wall 25 and top wall 28 in the airbag 20 as inflated. Moreover, since the circumferential wall 25 is composed of the circumferential panels 47 which are split into at least three (four, in the illustrated embodiment) in a circumferential direction, the circumferential wall 25 is formed into the barrel shape with a sufficient height or thickness when inflated, and the height is maintained by the joined portions 26 placed at four positions in the circumferential wall 25.

Therefore, the airbag 20 of the exemplary embodiment is inflatable into the contour with a sufficient height and few angular portions.

In the airbag 20 of the illustrated embodiment, the mount-forming panel 52 forming the mounting portion 22 is formed to continue from the mount-side end or leading end 47*b* of one of the circumferential panels 47 (i.e. in the circumferential panel 47A). This configuration facilitates the production of the airbag 20, in comparison with an instance where the mounting portion is formed of a separate base member. If such an advantageous effect does not have to be considered, the mounting portion may be formed of a separate base member and joined to the airbag base member.

Although the airbag 20 of the illustrated embodiment includes four circumferential panels 47A, 47B, 47C and 47D, the number of the circumferential panels should not be limited thereby, but may be three, five or more. However, taking into consideration a workability in production of the airbag (joining work of the circumferential panels, making of the mounting portion or joining work of the mount-forming portion) and an amount of airbag material, it would be desirable that the circumferential wall is composed of four circumferential panels from the viewpoint of production cost. In the airbag 20 of the illustrated embodiment, especially, the four circumferential panels 47A, 47B, 47C and 47D have a generally identical outer contour. In other words, all the edges 48A, 48B, 48C, 48D, 49A, 49B, 49C, 49D have an identical contour. This configuration will make a cross sectional contour of the circumferential wall 25 as inflated generally circular, which would be suitable for a steering wheel W which is adapted to be turned for steering. In the airbag 20, the airbag base member 45 is configured to have a generally square top-forming panel 46, and be bilaterally and anteroposteriorly symmetrical, except the mount-forming panel 52. Alternatively, the airbag may be composed of an airbag base member that has a generally rectangular top-forming panel and circumferential panels with accordingly different dimensions. The airbag composed of the base member configured like this will be formed into a barrel shape like a generally elliptical column when inflated. If the advantageous effects mentioned above do not have to be considered, the airbag base member may be configured such that only adjoining edges of two adjoining circumferential panels are symmetric to each other in curving shape while far-side edges of the adjoining circumferential panels are different from each other in curving shape.

The airbag 20 of the illustrated embodiment internally includes four tethers 37 that are generally radially arranged about the inlet port 23 for limiting a clearance between the mounting portion 22 and top wall 28 at airbag deployment. The tethers 37 prevent the top wall 28 from protruding towards the vehicle occupant excessively and being deployed apart from the mounting portion 22 more than necessary at airbag deployment. Although the tethers 37 are located at four positions in the airbag 20 of the illustrated embodiment, the tethers may alternatively be located at two positions, like tethers 37A in an airbag 20A depicted in FIG. 9. In the airbag 20A, the two tethers 37A are located on the left and right of the inlet port 23, symmetrically about the inlet port 23, circumventing an outlet area of inflation gas in the redirecting cloth 30 (i.e. the outlet openings 30a and 30b).

The airbag 20 of the illustrated embodiment further internally includes the redirecting cloth 30 for redirecting the inflation gas G which has flown in via the inlet port 23, and the two outlet openings 30a and 30b of the redirecting cloth 30 are disposed at two positions opposite across the inlet port 23 and dislocated from the tethers 37, as can be seen in FIG. 5. More particularly, the outlet openings 30a and 30b of the redirecting cloth 30 of the illustrated embodiment are located in front and at the rear of the inlet port 23. This configuration will help unfold the bag body 21 largely in the front and rear direction in an initial stage of airbag deployment. Further, since the outlet openings 30a and 30b are dislocated from the tethers 37, the tethers 37 will be able to control the behavior of the top wall 28 adequately without being affected by the redirected inflation gas G at airbag deployment.

In the airbag 20 of the exemplary embodiment, furthermore, the circumferential wall 25 can be formed by mating and joining adjoining edges 48 and 49 of adjoining circumferential panels 47, and repeating the same joining work around the top-forming panel 46. That is, the airbag 20 inflatable in a three-dimensional contour can be produced only by planar joining (sewing) work, which will contribute to reduction of production cost and workload.

The airbag 20 of the exemplary embodiment is configured to be inflatable into such a generally barrel shape that is able to cover the top plane of the steering wheel W all over thickly. It is the four joined regions 26 radially arranged in the circumferential wall 25 that shapes and retains the airbag 20 in that shape. The joined regions 26 maintain the height or thickness of the airbag 20 and maintain a planar shape of the mounting portion 22. With this configuration, the airbag 20 as inflated will be adequately supported on the outer periphery of the mounting portion 22 by the rim R of the steering wheel W, and the bag body 21 supported on the underside by the rim R will be able to protect the driver adequately. Moreover, since the bag body 21 is configured to cover the top plane of the rim R generally all over thickly and protrude from the steering wheel W largely, the bag body 21 will be able to adequately arrest the driver not only in the event of a frontal collision of the vehicle but also in the event of an oblique collision or offset collision though the driver moves obliquely forward.

Although the exemplary embodiments have been described as the airbag 20 is used for a steering wheel, the application of the invention should not be limited thereby. The invention may be applied to an airbag for use in a mid-mount airbag device for a passenger seat, by way of example.

What is claimed is:

1. An airbag which is composed of a flexible sheet-shaped material, the airbag being inflatable with an inflation gas and adapted to be folded and stored in a storage in a vehicle, the airbag comprising:
   a mounting portion that includes an inlet port for taking in the inflation gas, and is adapted to be coupled to the storage by a periphery of the inlet port;
   a top wall that is configured to be opposed to the mounting portion and face towards a seat when deployed;
   a circumferential wall that is disposed between the mounting portion and top wall; and
   an airbag base member that forms the airbag, the airbag base member including a top-forming panel that forms the top wall, and at least three circumferential panels that extend generally radially from the top-forming panel and form the circumferential wall by being joined together by adjoining edges thereof,
   wherein each of the circumferential panels is formed into a generally band-shaped contour which has a mount-side end adapted to adjoin the mounting portion, an intermediate portion, a top-side end adjoining the top-forming panel, and first and second curving edges that make the circumferential panel enlarge in width from the mount-side end towards the intermediate portion and then narrow towards the top-side end; and
   wherein, when the airbag base member is laid flat, the adjoining edges of any two adjoining circumferential panels are generally symmetrical to each other in curving shape with respect to a line disposed there between.

2. The airbag of claim 1, further comprising a mount-forming panel that forms the mounting portion of the airbag, the mount-forming panel being formed continuously from the mount-side end of one of the circumferential panels.

3. The airbag of claim 2 comprising four circumferential panels.

4. The airbag of claim 3, wherein the four circumferential panels have a generally identical outer contour.

5. The airbag of claim 1, further internally including four tethers that are radially arranged about the inlet port for limiting a clearance between the mounting portion and top wall at airbag deployment.

6. The airbag of claim 5, further internally including a redirecting cloth that redirects the inflation gas which has flown in via the inlet port and releases the gas from two outlet openings thereof at airbag deployment, the two outlet openings being disposed at positions opposite across the inlet port and dislocated from the tethers.

7. The airbag of claim 1, further internally including two tethers that are radially arranged about the inlet port for limiting a clearance between the mounting portion and top wall at airbag deployment.

8. The airbag of claim 7, further internally including a redirecting cloth that redirects the inflation gas which has flown in via the inlet port and releases the gas from two outlet openings thereof at airbag deployment, the two outlet openings being disposed at positions opposite across the inlet port and dislocated from the tethers.

9. The airbag of claim 1 adapted for use for a steering wheel.

10. Method of producing an airbag which is inflatable with an inflation gas and adapted to be folded and stored in a storage in a vehicle, the airbag including a mounting portion that includes an inlet port for taking in the inflation gas, and is adapted to be mounted on the storage by a periphery of the inlet port; a top wall that is configured to be opposed to the mounting portion and face towards a seat when deployed; and a circumferential wall that is disposed between the mounting portion and top wall, the method comprising:

provided an airbag base member that is formed of a flexible sheet-shaped material and includes a top-forming panel for forming the top wall, four circumferential panels that extend generally radially from the top-forming panel and are generally identical to one another in outer contour, and a mount-forming panel that is disposed at a leading end of one of the circumferential panels for forming the mounting portion, wherein each of the circumferential panels is formed into a generally band-shaped contour which has first and second edges that are curving and symmetrical to each other and make the circumferential panel enlarge in width from the leading end towards an intermediate portion and then narrow towards the top-forming panel;

mating the first edge of one of the circumferential panels with the second edge of an adjoining circumferential panel by folding back the top-forming panel, and joining the mated edges together;

forming the circumferential wall by repeating the joining work of the circumferential panels around the top-forming panel; and joining a circumferential edge of the mount-forming panel to the leading ends of the circumferential panels.

\* \* \* \* \*